(12) United States Patent
Restiau et al.

(10) Patent No.: US 9,369,319 B1
(45) Date of Patent: *Jun. 14, 2016

(54) WIRELESS COMMUNICATION DEVICE AND METHOD FOR IDENTIFYING THE TYPE OF MODULATION AMONG A PLURALITY OF MODULATION TYPES IN A NEAR FILED COMMUNICATION DEVICE

(71) Applicant: Proton World International N.V., Zaventem (BE)

(72) Inventors: Guy Restiau, Ramillies (BE); Youssef Ahssini, Vilvoorde (BE)

(73) Assignee: Proton World International N.V., Diegem (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/060,147

(22) Filed: Mar. 3, 2016

Related U.S. Application Data

(63) Continuation of application No. 14/348,348, filed as application No. PCT/EP2012/068646 on Sep. 21, 2012, now Pat. No. 9,312,920.

(30) Foreign Application Priority Data

Sep. 30, 2011 (FR) ...................... 11 58817

(51) Int. Cl.
*H04L 27/00* (2006.01)
*H04B 5/00* (2006.01)
*H04W 72/04* (2009.01)
*H04W 4/00* (2009.01)

(52) U.S. Cl.
CPC .......... *H04L 27/0012* (2013.01); *H04B 5/0031* (2013.01); *H04W 4/008* (2013.01); *H04W 72/0446* (2013.01)

(58) Field of Classification Search
CPC ............ H04L 27/0012; H04L 27/0008; H04L 1/0003
See application file for complete search history.

(56) References Cited

U.S. PATENT DOCUMENTS

| | | | |
|---|---|---|---|
| 6,213,402 B1 | 4/2001 | Reiner | |
| 8,537,907 B2 | 9/2013 | Sung | |
| 9,143,201 B2 | 9/2015 | Sung | |
| 2008/0091677 A1 | 4/2008 | Pedersen | |
| 2009/0322484 A1 | 12/2009 | Toriyama et al. | |

(Continued)

FOREIGN PATENT DOCUMENTS

| | | |
|---|---|---|
| EP | 2 226 950 A2 | 9/2010 |
| EP | 2 234 356 A2 | 9/2010 |

OTHER PUBLICATIONS

International Search Report and Written Opinion, dated Nov. 6, 2012 for corresponding International Application No. PCT/EP2012/068646.

*Primary Examiner* — Bobbak Safaipour
*Assistant Examiner* — Devan Sandiford
(74) *Attorney, Agent, or Firm* — Seed IP Law Group PLLC

(57) ABSTRACT

A method for configuring a first near-field communication device according to a modulation type transmitted by a second device, wherein: a decoder of the first device is configured to decode an overcoded type-B modulation; a signal received during a first time slot corresponding to the duration of a symbol of an initialization frame is decoded; and the first device is configured according to the value of the decoded symbol to determine the modulation type.

22 Claims, 3 Drawing Sheets

(56) References Cited

U.S. PATENT DOCUMENTS

| | | |
|---|---|---|
| 2010/0124258 A1 | 5/2010 | Sekiguchi et al. |
| 2010/0191870 A1 | 7/2010 | Qi et al. |
| 2010/0248624 A1 | 9/2010 | Miyakawa |
| 2011/0142040 A1 | 6/2011 | Funamoto et al. |
| 2011/0183635 A1 | 7/2011 | Kim |
| 2012/0028574 A1 | 2/2012 | Bangs et al. |
| 2013/0083787 A1 | 4/2013 | Restiau et al. |
| 2013/0100825 A1 | 4/2013 | Bancel et al. |

WIRELESS COMMUNICATION DEVICE AND METHOD FOR IDENTIFYING THE TYPE OF MODULATION AMONG A PLURALITY OF MODULATION TYPES IN A NEAR FILED COMMUNICATION DEVICE

TECHNICAL FIELD

Embodiments generally relate to electronic circuits and, more specifically, to near-field radio frequency communication devices. Such devices are generally known as NFC (Near Field Communication) devices.

DISCUSSION OF THE RELATED ART

More and more radio frequency communication devices are capable of operating in near field with a fixed terminal or another mobile device. In particular, most mobile phone type telecommunication devices are now equipped with a near-field communication (NFC) router.

It is generally spoken of NFC devices operating in card mode (or emulating a card), as opposed to a second operating mode of these devices, which is to emulate a card reader to cooperate with another near-field device. The device then behaves as a terminal.

There are different near-field communication standards. The difference between such standards essentially is the modulation and coding type of data to be transmitted. Formerly, transponders were most often dedicated to one type of modulation. They are now designed to be able to operate according to different modulation types and can thus be configured to set this type for each new transaction with a terminal.

The modulation type is most often set by the terminal, and the transponder-type device modifies the configuration of its NFC router to be able to communicate with the reader.

Usually, the router or the radio frequency front head capable of operating according to different modulations successively switches to these different modulations until it recognizes a request transmitted by a reader. This however takes time.

Further, some terminals are themselves capable of operating according to different modulation types to be able to adapt to transponders dedicated to a single type. In this case, the terminal successively sends requests according to the different types until it receives a response in one of the types. However, the terminal should leave enough time between two types (generally on the order of a few milliseconds) so that a configurable transponder also has time to scan the different modulation types until both configurations (terminal and transponder) match.

Such a configuration process is long and makes the device in card mode risk never to detect a request.

SUMMARY

An embodiment is to overcome all or part of the disadvantages of usual card-mode near-field telecommunication devices.

Another embodiment is to provide a process for configuring a device in card mode.

Thus, an embodiment provides a method for configuring a first near-field communication device according to a modulation type transmitted by a second device, wherein:

a decoder of the first device is configured to decode an overcoded type-B modulation;

a signal received during a first time slot corresponding to the duration of a symbol of an initialization frame is decoded; and the first device is configured according to the value of the decoded symbol to determine the modulation type.

According to an embodiment, said duration approximately corresponds to 9.44 microseconds.

According to an embodiment, said symbol is divided in 8 and decoded by assigning a state 0 or 1 to each eighth.

According to an embodiment, if the first symbol is 00 in hexadecimal notation, a second time slot of same duration as the first one and consecutive thereto is decoded for type B.

According to an embodiment:

if a second symbol corresponding to the second time slot is also 00 in hexadecimal notation, the decoder is configured for the type-B modulation; and otherwise, the decoder is configured for the type-15693 modulation.

According to an embodiment, if, in hexadecimal notation, the first symbol is different from 00 and smaller than AA, the decoder is configured for the 15693-type modulation.

According to an embodiment, if the first symbol is equal to value FC in hexadecimal notation, the decoder is configured for the type-A modulation.

According to an embodiment, if the first symbol is equal to value AA in hexadecimal notation, the decoder is configured for the type-C modulation.

Another embodiment provides a near-field reception device comprising the above circuit.

BRIEF DESCRIPTION OF THE DRAWINGS

The foregoing and other features, and advantages will be discussed in detail in the following non-limiting description of specific embodiments in connection with the accompanying drawings.

DETAILED DESCRIPTION

Figure 1:
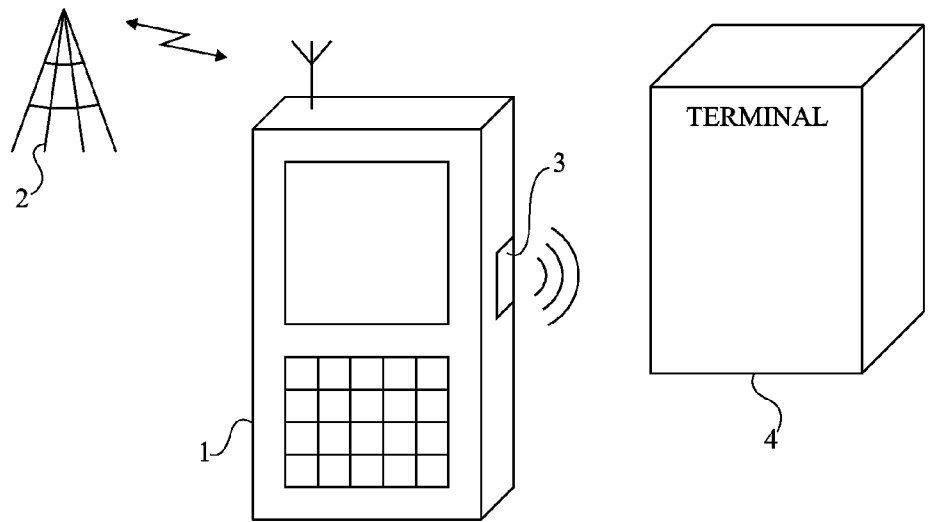
FIG. 1 is a simplified diagram of a system of the type to which the embodiments which will be described apply.

The same elements have been designated with the same reference numerals in the different drawings, where the timing diagrams have been drawn out of scale. For clarity, only those steps and elements which are useful to the understanding of the described embodiments have been shown and will be detailed. In particular, the circuits for generating communication frames according to the different standards have not been detailed, the described embodiments being compatible with usual standards. Further, the generation of polling requests by a read or read/write terminal has not been detailed either, the described embodiments being here again compatible with usual terminals.

The embodiments which will be described aim at an NFC router operating in card mode and at its configuration for a communication with a reader.

FIG. 1 is a simplified drawing of an example of a communication system of the type to which the embodiments which will be described apply.

A mobile telecommunication device 1 (for example, a GSM-type mobile device) is capable of communicating with a network symbolized by an antenna 2. Device 1 is further equipped with a near-field communication router 3 capable of communicating with a terminal 4 (TERMINAL) for generating a radio frequency field.

Most often, a device 1 equipped with an NFC router is capable of operating both in so-called reader mode and in so-called card mode. In reader mode, device 1 and its NFC router 3 behave as a read and write terminal of another near-field communication device. In card mode, the mobile device operates as a contactless electromagnetic transponder or chip card to communicate with a terminal 4. There exist many alternative telecommunication devices equipped with an NFC router, but all use the same principle: when operating in card mode and within the range of a near-field communication terminal, they wait for a request from this terminal to respond thereto.

The embodiments which will be described hereinafter more specifically refer to devices integrating both near-field communication (NFC) and telecommunication means. The described solutions however apply to any near-field communication device capable of operating according to several modulation types or standards.

When such a device is within the range of a terminal, it successively switches to the different modulation types with which it is capable of operating to detect the type according to which the terminal sends its request and to be able to start a near-field communication therewith.

In certain cases, the terminal itself is capable of operating according to different types. In this case, it starts by sending a request according to a first communication or modulation type and then, in the absence of any response from a transponder, it switches to another type, and so on. On the terminal side, this operation continues in a loop as long as no response from a transponder has been received.

Such usual solutions take time before the communication can start. Further, the modulation type risks not being detected.

This problem becomes even more critical with the development of NFC routers capable of operating according to different modulation types and the multiplicity of multistandard terminals.

The embodiments which will be described take advantage of the specificities to the most frequent near-field communication standards to shorten the time of detection of the modulation type and avoid situations where no type is detected.

Any transmission from a near-field communication terminal to a transponder (reference will be made to a card hereinafter) is performed in amplitude modulation. The difference between modulation types is due to the coding of the amplitude modulation transmission to transmit the bits.

Figure 2:
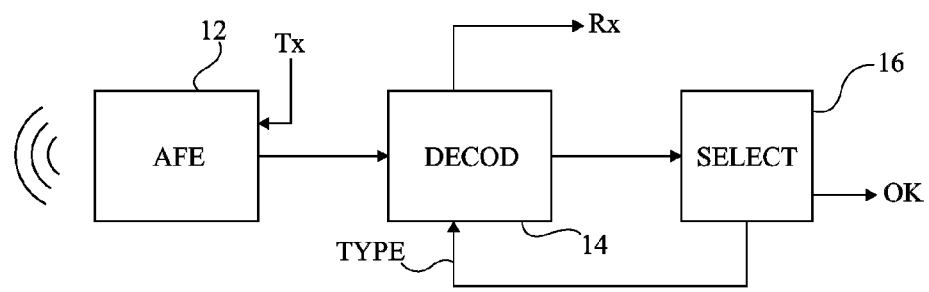
FIG. 2 is a block diagram of an embodiment of an NFC router configuration system.

FIG. 2 is a simplified block diagram of an embodiment of a modulation type selection device. The representation of FIG. 2 is simplified and functional.

The NFC router is assumed to comprise an analog front end 12 (AFE) equipped with means for receiving the radio frequency signals. In the example of FIG. 2, analog front end 12 is further assumed to be equipped with means (symbolized by a signal Tx) enabling to transmit towards the terminal. It is generally spoken of a retromodulation from the transponder to the terminal. An output of front end 12 is sent to a demodulator/decoder 14 (DECOD) of the received signals. It for example is an amplitude demodulation circuit associated with a digital decoder. Decoder 14 provides the received signals (Rx) to the other mobile telecommunication device circuits (not shown). According to the embodiment shown in FIG. 2, circuit 14 also delivers the demodulated signal to a block 16 (SELECT) for selecting the received modulation type (TYPE).

The function of decoder 14 is, from a modulation type with which it is initially configured, to detect the real type of modulation of the signal received from front end 12, in order to configure decoder 14 for the rest of the transmission once the type has been selected by block 16.

As will be explained hereinafter in relation with FIG. 4, it is provided to use a decoding based on a so-called overcoded type-B modulation to detect the different modulation types that may be received.

In NFC routers, radio frequency communications are based on standards respecting a carrier frequency of approximately 13.56 MHz. Transmissions from the terminal to the transponder are amplitude-modulated, mainly according to four families of types, called type A, type B, type C, and type 15693 (ISO standards 14443). The different types have different transmission speeds, carrier modulation indexes, and data codings.

The transmission speed of types A and B is 106 kbits/s, 212 kbits/s, 424 kbits/s, or 848 kbits/s. The transmission speed of type C is 212 kbits/s or 424 kbits/s. The speed of type 15693 is 6.64 kbits per second or 26.48 kbits/s.

The modulation index of type A is 100%. The modulation index of type B is 10%. Type C has a modulation index ranging between 8 and 30%. Type 15693 has a modulation index of 100% (type noted 15693-100) or 10% (type 15693-10). Type 15693 at 6.64 kbits/s bears reference 256 (15693-100-256 and 15693-10-256) and type 15693 at 26.48 kbits/s bears reference 4 (15693-100-4 and 15693-10-4).

Figure 3:
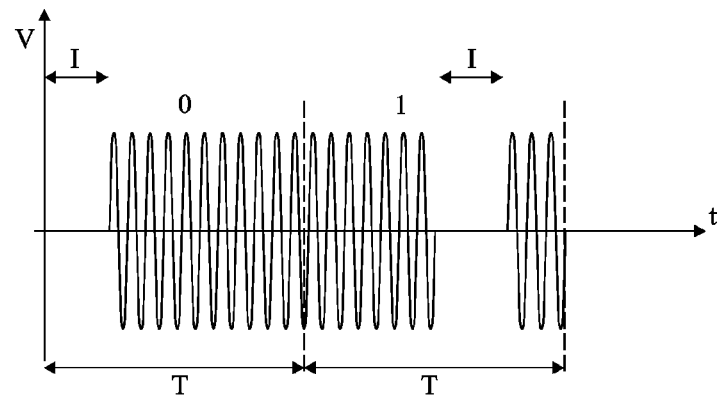
FIG. 3 is a simplified timing diagram illustrating an example of modulated signals received by an NFC router.

FIG. 3 illustrates, in a simplified timing diagram, a usual example of amplitude modulation transmission of bits at states 0 and 1 with a type-A modulation. These timing diagrams show examples of the shape of voltage V recovered by front end 12. These signals are carried by a carrier at 13.56 MHz and are amplitude-modulated.

In the case of a terminal-to-transponder transmission considered herein to detect, on the transponder side, the modulation type transmitted by the terminal, the data bits are, in type A, coded according to the position of a modulation-free interval I (or at a level lower than the high no-load level for other types such as type B) during a determined period T representing a symbol. This modulation type is an ASK-type modulation (amplitude shift keying). A bit 0 is decoded if pulse I is at the beginning of a period T and a bit 1 is decoded if pulse I is not at the beginning of period T. The duration of period T, and thus of a symbol, is approximately 9.44 microseconds. The duration of pulse I corresponds to the duration of the symbol divided by 4.

The amplitude modulation is performed by lowering a high level since near-field communication systems basically are designed for transponders extracting the power supply of the circuits contained therein from the high-frequency field emitted by the terminal.

The embodiments which will be described take advantage of the fact that, whatever the modulation type, a transmission from the terminal to the transponder starts by an initial phase according to a specific coding but with symbols all having a duration of approximately 9.44 microseconds (corresponding to a 106 kbits/s speed) independently from the modulation type.

An overcoding based on a unit duration corresponding to the duration of a period of a sub-carrier used by these systems at a frequency of approximately 847.5 kHz is then defined. This sub-carrier is in particular used for a retromodulation from the transponder to the terminal.

The performed overcoding amounts to sampling a symbol having a duration of 9.44 microseconds over 8 bits (according to the periodicity of the sub-carrier frequency). It is then provided to interpret this overcoding of 8 bits per symbol to tell the different modulation types from one another. In other words, a symbol is divided into 8 elements and a state 0 or 1 is assigned to each symbol eighth according to its (relative) low or high level. In practice, this decoding is performed by a type-B demodulator parameterized at approximately 847.5 kHz. It is thus sufficient to interpret differently the value of a type-B demodulated symbol.

Figure 4:
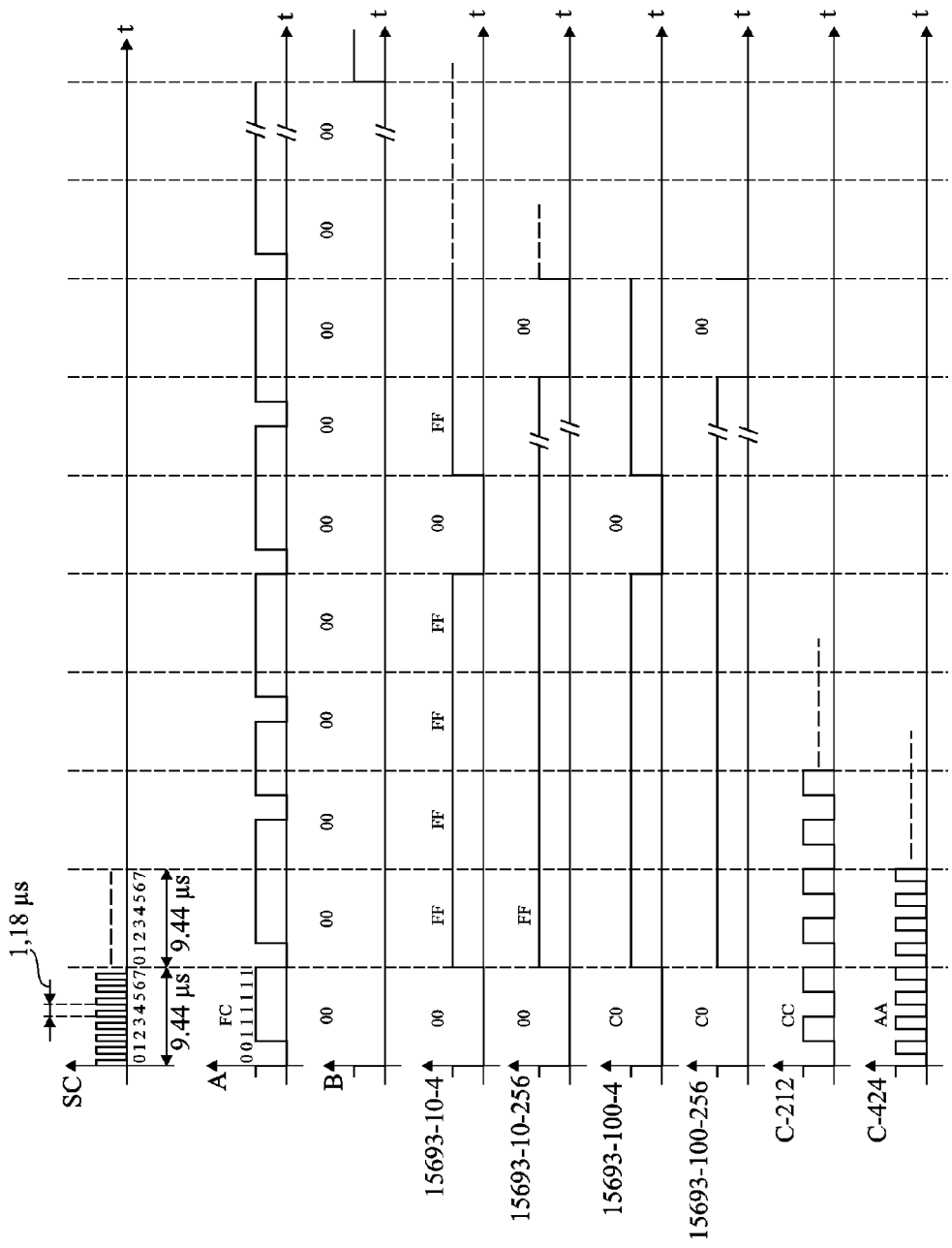
FIG. 4 shows timing diagrams illustrating initial phases of communication according to different modulation types capable of being used by an NFC router operating in card mode.

FIG. 4 shows timing diagrams according to different modulation types to illustrate the selection mode used in relation with FIG. 2. The first timing diagram illustrates the shape of carrier SC approximately at 848 kHz (period of approximately 1.18 µs). The following timing diagrams illustrate the respective shapes of the symbols present at the beginning of a frame, respectively according to the following types:

A: symbol representing a real bit (106k) in type A (FIG. 3);
B: 10 symbols at 0 followed by 2 symbols at 1;
15693-10(or 100)-4: 1 symbol in the low state followed by 4 symbols in the high state, followed by a symbol in the low state followed by 2 symbols in the high state;
15693-10(or 100)-256: 1 symbol in the low state followed by 6 symbols in the high state, followed by one symbol in the low state;
C-212 (type C at 212 kbits/s): alternation of pulses representing pulses I of a type A at 0 and at 1; and
C-424 (type C at 424 kbits/s): alternations of 4 states 0 and 4 states 1 per symbol.

In FIG. 4, the codes taken by the different symbols over 8 bits have also been shown in hexadecimal notation.

The frames, which may be of initialization frame type, illustrated in FIG. 4, are transmitted during relatively long time periods to leave time for a transponder to detect the frame. For example:

a type-B frame represents 94 microseconds;
a type-C-424 frame represents 112 microseconds;
a type-C-212 frame represents 224 microseconds; and
a frame 15693 represents approximately 75 microseconds.

Waiting each time for a full frame for the terminal in order to consider a lack of compatibility with the transponder before switching to another type of modulation takes time.

Further, applications in which near-field communications are used generally are applications where a user brings his device close to the terminal and where transactions should be performed rapidly.

It is provided to use one or two 9.44-µs durations representing the transmission time of a 106-kbits/s symbol in a starting phase, to determine the modulation type used by the terminal during the sending of its start of frame.

Figure 5:
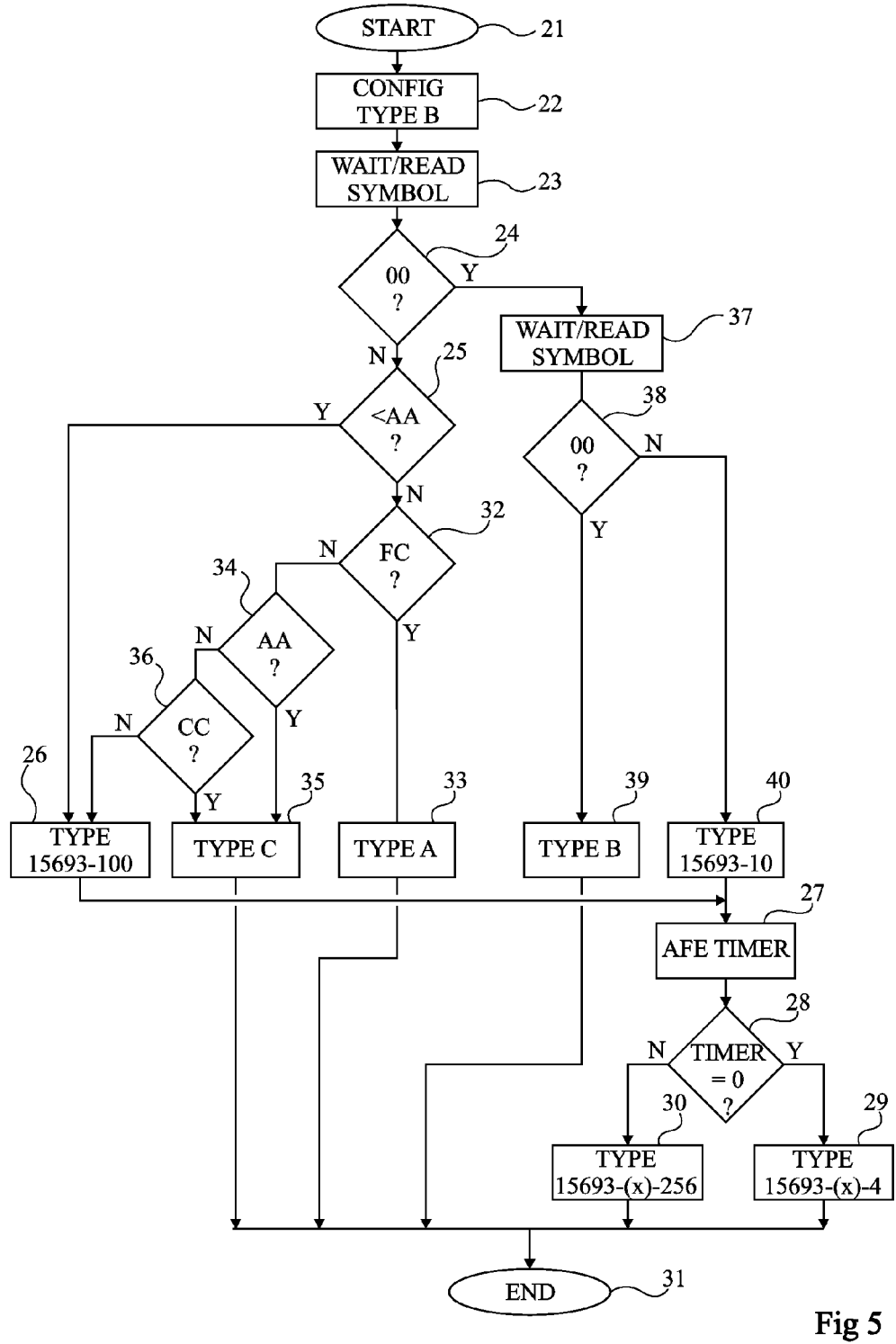
FIG. 5 is a simplified flowchart of an NFC router configuration mode.

FIG. 5 is a simplified flowchart of a selection mode implemented by selector 16 of FIG. 2 to determine the type of modulation transmitted by a terminal.

At the starting of the system (block 21, START), radio frequency front end is woken up by the receiving of a signal from a terminal and selector 16 initially configures decoder 14 to be able to decode an overcoded type-B modulation (block 22, CONFIG TYPE B). The no-load configuration of decoder 14 thus is type B.

Decoder 14 demodulates and decodes the received signal as if it was a type-B modulation and sends the received bits to selector 14. The received bits are sent in parallel to the rest of the transponder circuit but are not used for the time being. In particular, as long as selector 16 has not validated the modulation type by a signal intended for these circuits (a validation bit OK intended for the device microcontroller), signal Rx is not used.

The selector waits (block 23, WAIT/READ SYMBOL) for the reception of 8 overcoded bits (of a symbol). This amounts to decoding, in type B, a 9.44-µs time slot, independently from the received signal and from the coding performed by the modulation type.

For simplification, the values of the symbols will be arbitrarily expressed in hexadecimal notation hereinafter.

Once these 8 bits have been received and decoded, selector 16 determines whether these bits correspond to a symbol of value 00 (block 24, 00?).

If not (output N of block 24), this means that the modulation is neither of type B nor of type 15693(100 or 10)-4. It is then tested (block 25, <AA?) whether the value of the symbol is smaller than value AA. If the answer is positive (output Y of block 25), this means that the modulation is of type 15693-100. Selector 16 then configures decoder 14 accordingly (block 26, TYPE 15693-100).

To be able to tell type 15693-100-4 from type 15693-100-256, the time counter of radio frequency front end 12 is configured (block 27, AFE TIMER) on the duration of 4 symbols and it is waited for the reception of the next symbol. If, during this reception, the time counter has expired (output Y of block 28, TIMER=0?), this means a mode 15693-100-4 (block 29, TYPE 15693-(x)-4). In the opposite case (output N of block 28), this means type 15693-100-256 (block 30, TYPE 15693-(x)-256).

At the end of the configuration, the system is capable of providing (block 31, END) the properly-decoded frame to the rest of the telecommunication device. Indeed, the selection of the type which is performed in at most two symbols does not adversely affect the reception and the frame can be immediately interpreted.

If the first symbol is not smaller than value AA (output N of block 25), this means either a type A, or a type C.

It is then tested (block 32, FC?) whether the value of the symbol is FC. If it is (output Y of block 32), selector 16 configures decoder 14 on type A (block 33, TYPE A). If it is not (output N of block 32), it is checked whether the symbol is AA (block 34, AA?). If it is, this means that the modulation is of type C-424 (block 35, TYPE C). Otherwise, it is verified whether the value of the symbol is CC (block 36, CC?). If it is (output Y of block 36), the type is C-212 and the decoder is configured for type C (block 35, TYPE C). Otherwise, this means that the modulation is of type 15693-100 and it is returned to block 26 to cover the rest of the uncertain symbols.

If the first symbol is 00 (output Y of block 24), it is waited for the reception of the next symbol (block 37, WAIT/READ SYMBOL) of a 9.44-µs duration to differentiate a type B from a 15693 modulation. The value of this second symbol is compared with zero (block 38, 00?). If it is zero, this means a type-B modulation and the decoder is then appropriately configured (block 39, TYPE B). If it is not (output N of block 38), this means that the modulation is of type 15693-10 (block 40, TYPE 15693-10) and the decoder is appropriately configured.

Once the decoder has been configured for type 15693-10, the operations of block 27 to 30 are performed as at the output of block 26 to determine whether the modulation is of type 4 or of type 256.

In FIG. 5, the outputs of the configurations in type B, in type C, and in type 15693 lead to block 31. Preferably, the type-A configuration (output of block 33) is processed differently.

The foregoing description shows that by interpreting at most two consecutive time slots having a duration corresponding to that of a symbol of the initialization frames, it is possible to configure the receiver whatever the modulation type from among the above types by interpretation of the symbol as if it was overcoded over 8 bits.

It is thus no longer necessary to wait for the end of a frame, nor for a switching of the terminal to another modulation type. As soon as it is properly configured according to the method of FIG. 5, the device in card mode responds to the terminal by using the right type of retromodulation, which is a function of the modulation type.

This method may be used either to configure a device in near field while a terminal only transmits according to a modulation type, or to match the modulation of this near-field device with respect to a terminal scanning the different modulation types. In both cases, the devices are then capable of communicating together.

This method may be used either to configure a device in near field while a terminal only transmits according to a modulation type, or to match the modulation of this near-field device with respect to a terminal scanning the different modulation types. In both cases, the devices are then capable of communicating together.

Once the type has been identified by the selector, the mobile telecommunication device is configured to send an acknowledgement message to the terminal. Receiving this response, the terminal knows that the transponder is capable of interpreting the modulation that it transmits.

In a simplified embodiment, the above-described method only detects some of the described modulation types.

For example, for a device only operating according to types B and 15693, only tests 24, 25, and 38 will be performed and, in case of a negative outcome of test 25, the device does not respond and waits for the terminal to switch to another modulation type.

Further, the order of the tests may be modified.

Various embodiments have been described. Various alterations and modifications will readily occur to those skilled in the art. In particular, the selection of the types detected by the implementation of these embodiments depends on the concerned mobile telecommunication device, provided for it to be capable of decoding at least one type-B modulation.

Further, the practical implementation of the described embodiments is within the abilities of those skilled in the art based on the functional indications given hereabove. In particular, the interpretation of the transmitted symbols may be performed by the digital processing circuits usually present in a device comprising an NFC router. It will however be ascertained to parameterize the receive front end and the decoder on an interpretation of a signal duration approximately corresponding to 9.44 microseconds.

The invention claimed is:

1. A device, comprising:
   demodulation and decoding circuitry, which in operation, decodes received signals according to a selected modulation type of a plurality of modulation types; and
   modulation-type selection circuitry, coupled to the demodulation and decoding circuity, wherein the modulation-type selection circuitry, in operation,
      controls the demodulation and decoding circuitry to decode a received signal as a type-B modulated signal for a first time slot; and
      when a result of the decoding of the first time slot as a type-B modulated signal is 00 in hexadecimal notation, the modulation-type selection circuitry:
         controls the demodulation and decoding circuitry to decode the received signal as a type-B modulated signal for a second time slot:
         when a result of the decoding of the received signal for the second time slot is 00 in hexadecimal notation, selects type-B modulation as the modulation type of the received signal; and
         when a result of the decoding of the received signal for the second time slot is different from 00 in hexadecimal notation, selects type-15693-10 as the modulation type of the received signal.

2. The device of claim 1 wherein said time slot has a duration of 9.44 microseconds.

3. The device of claim 1 wherein when the result of decoding the first time slot is different from 00 in hexadecimal notation and smaller than AA in hexadecimal notation, the modulation-type selection circuitry selects type-15693-100 modulation as the modulation type of the received signal.

4. The device of claim 1 wherein when the result of decoding the first time slot is FC in hexadecimal notation, the modulation-type selection circuitry selects type-A modulation as the modulation type of the received signal.

5. The device of claim 1 wherein when the result of decoding the first time slot is AA in hexadecimal notation, the modulation-type selection circuitry selects type-C modulation as the modulation type of the received signal.

6. The device of claim 1 wherein when the result of decoding the first time slot is CC in hexadecimal notation, the modulation-type selection circuitry selects type-C modulation as the modulation type of the received signal.

7. The device of claim 1 wherein when the result of decoding the first time slot is not included in a set of results {00, FC, AA, CC} in hexadecimal notation, the modulation-type selection circuitry selects type-15693-100 modulation as the modulation type of the received signal.

8. The device of claim 7 wherein when the modulation-type selection circuitry selects type-15693-100 modulation as the modulation type of the received signal, the modulation-type selection circuitry determines whether the received signal is a type-15693-100-4 signal or a type-15693-100-256 signal.

9. The device of claim 1 wherein when the modulation-type selection circuitry selects type-15693-10 modulation as the modulation type of the received signal, the modulation-type selection circuitry determines whether the received signal is a type-15693-10-4 signal or a type-15693-10-256 signal.

10. A system, comprising:
    analog-front-end circuitry; and
    digital-signal-processing circuitry coupled to the analog-front-end circuitry, wherein the digital-signal-processing circuitry, in operation,
       decodes a received signal as a type-B modulated signal for a first time slot; and
       when a result of the decoding of the first time slot as a type-B modulated signal is 00 in hexadecimal notation:
          decodes the received signal as a type-B modulated signal for a second time slot:
          when a result of the decoding of the received signal for the second time slot is 00 in hexadecimal notation, selects type-B modulation as the modulation type of the received signal; and
          when a result of the decoding of the received signal for the second time slot is different from 00 in hexadecimal notation, selects type-15693-10 as the modulation type of the received signal.

11. The system of claim 10 wherein said time slot has a duration of 9.44 microseconds.

12. The system of claim 10 wherein when the result of decoding the first time slot is different from 00 and smaller than AA, the digital-signal-processing circuitry selects type-15693-100 modulation as the modulation type of the received signal.

13. The system of claim 10 wherein when the result of decoding the first time slot is FC in hexadecimal notation, the digital-signal-processing circuitry selects type-A modulation as the modulation type of the received signal.

14. The system of claim 10 wherein when the result of decoding the first time slot is AA in hexadecimal notation, the digital-signal-processing circuitry selects type-C modulation as the modulation type of the received signal.

15. The system of claim 10 wherein when the result of decoding the first time slot is CC in hexadecimal notation, the digital-signal-processing circuitry selects type-C modulation as the modulation type of the received signal.

16. The system of claim 10 wherein when the result of decoding the first time slot is not included in a set of results {00, FC, AA, CC} in hexadecimal notation, the digital-signal-processing circuitry selects type-15693-100 modulation as the modulation type of the received signal.

17. A method comprising:
    selecting a modulation type of a received signal by:
        decoding the received signal as a type-B modulated signal for a first time slot; and
        when a result of the decoding of the first time slot as a type-B modulated signal is 00 in hexadecimal notation:
            decoding the received signal as a type-B modulated signal for a second time slot:
                when a result of the decoding of the received signal for the second time slot is 00 in hexadecimal notation, selecting type-B modulation as the modulation type of the received signal; and
                when a result of the decoding of the received signal for the second time slot is different from 00 in hexadecimal notation, selecting type-15693-10 as the modulation type of the received signal; and
    decoding the received signal using the selected modulation type.

18. The method of claim 17, comprising:
when the result of decoding the first time slot, in hexadecimal notation, is different from 00 and smaller than AA, selecting type-15693-100 modulation as the modulation type of the received signal.

19. The method of claim 17, comprising:
when the result of decoding the first time slot is FC in hexadecimal notation, selecting type-A modulation as the modulation type of the received signal.

20. The method of claim 17, comprising:
when the result of decoding the first time slot is AA in hexadecimal notation, selecting type-C modulation as the modulation type of the received signal.

21. The method of claim 17, comprising:
when the result of decoding the first time slot is CC in hexadecimal notation, selecting type-C modulation as the modulation type of the received signal.

22. The method of claim 17, comprising:
when the result of decoding the first time slot is not included in a set of results {00, FC, AA, CC} in hexadecimal notation, selecting type-15693-100 modulation as the modulation type of the received signal.

\* \* \* \* \*